Dec. 15, 1936.  L. C. FRANK ET AL  2,063,994
EMERGENCY ELECTRIC PLANT
Filed June 14, 1934
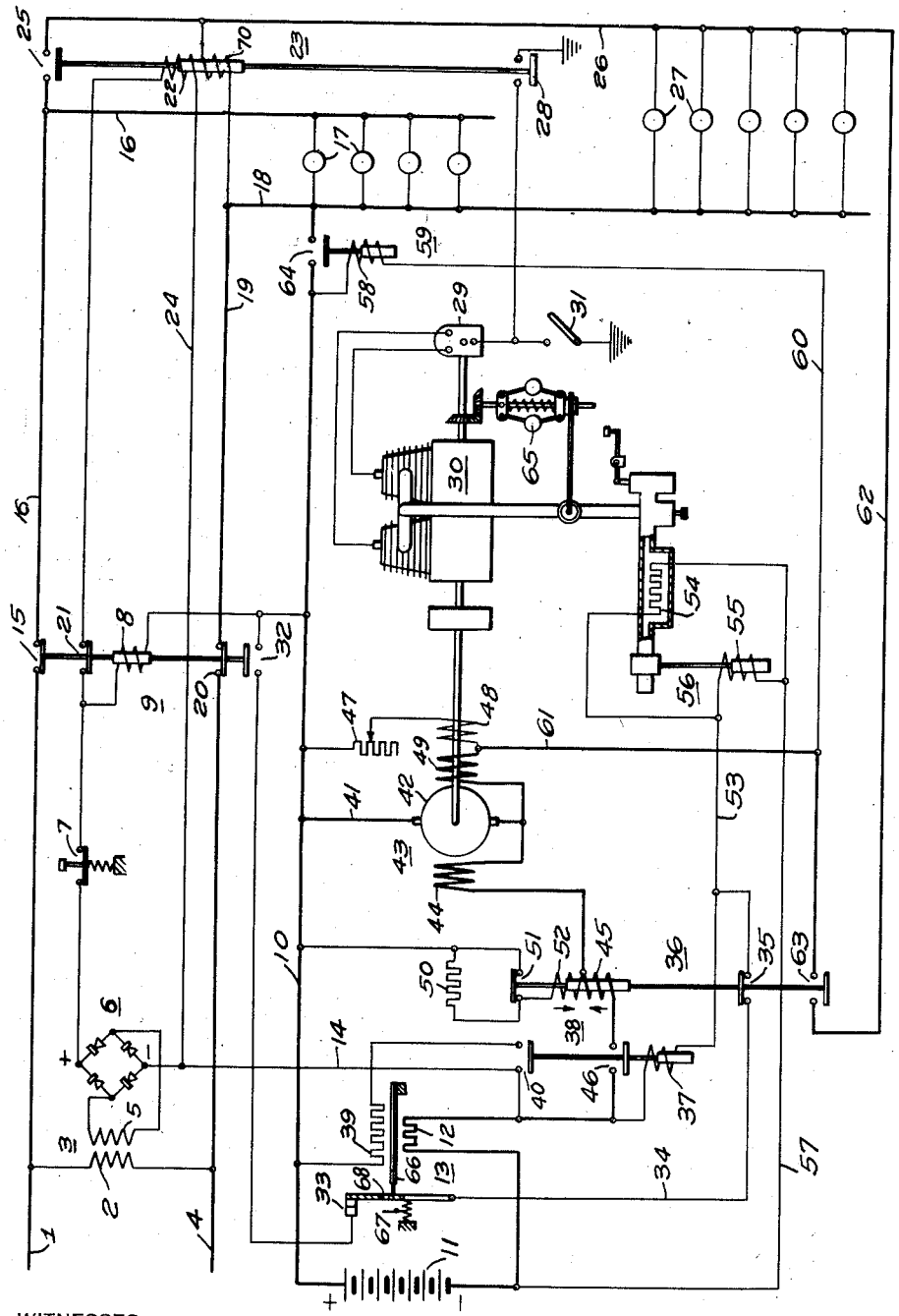
WITNESSES:
E. A. McCloskey.
Paul E. Friedemann
INVENTORS
Leo C. Frank and
Stanley A. Bobe.
BY
W. R. Coley
ATTORNEY Patented Dec. 15, 1936

2,063,994

UNITED STATES PATENT OFFICE 2,063,994

EMERGENCY ELECTRIC PLANT

Leo C. Frank, Irwin, and Stanley A. Bobe, McKeesport, Pa., assignors to Westinghouse Electric & Manufacturing Company, East Pittsburgh, Pa., a corporation of Pennsylvania Application June 14, 1934, Serial No. 730,628

5 Claims. (Cl. 290—30)

This invention relates to power plants and more particularly to power plants utilized in conjunction with a source of power so as to provide continuous service to certain current-consuming devices.

In theaters there are certain current-consuming devices which are normally utilized in the operation of the theater and still other current-consuming devices, such as the lights illuminating exits, aisle lights and others which are disposed for the protection of the occupants of the theater. Normally, all such current-consuming devices are supplied with energy from a source of alternating current. However, in case of failure of the source of supply provision must be made to properly illuminate aisle lights, exit lights and certain other current-consuming devices to protect the patrons.

At airplane landing fields a number of current-consuming devices are usually utilized but where the landing field is used for regular night service, it is very necessary that the flood lights to illuminate the landing area be in service regardless of the condition of the normal source of supply for the landing field. It is thus very necessary that an emergency power plant be held in readiness in case of failure of the main source of supply, which emergency power plant may be set in operation to illuminate the flood lights.

An emergency power plant thus has utility in theaters, landing fields, beacons indicating air lanes, as well as light houses and possibly many other places where it is very essential that certain current-consuming devices remain in service regardless of the power failure from the usual source of supply.

One object of this invention is to provide for selectively interconnecting certain current-consuming devices in load systems with sources of power.

Another object of this invention is the provision of an emergency power plant in conjunction with the usual source of supply, and the selective interconnection of certain current-consuming devices with the emergency power plant and the usual source of supply.

A still further object of this invention is to provide for automatically disconnecting certain current-consuming devices from a source of supply, the voltage of which has failed, and connecting said current-consuming devices to a second source of supply.

A still further and more specific object of this invention is the provision of means responsive to the voltage of a source of supply for connecting certain current-consuming devices to said source of supply and for effecting the connection of said current-consuming devices to another source of supply when the voltage of said first-named source of supply decreases below a certain value.

Other objects and advantages will become more apparent from a study of the single figure illustrating this invention, which single figure shows diagrammatically an emergency power plant in cooperative relation with the usual source of supply.

Generally considered, this invention embodies an internal combustion engine 30 having the usual ignition system 29 which is adapted to be disconnected, or short-circuited, by the closing of either one of a pair of switches or contact members 31 and 28. The engine is provided with a mechanical governor 65, although any other kind of governor may be readily used.

In the particular installation shown, the internal combustion engine is supplied with energy from a tank (not shown) containing gasoline or any other liquid fuel and to assist in the vaporization of the fuel, a heater 54 and a choke valve 56 are provided.

The internal combustion engine when in operation drives a direct-current generator 43 which is adapted to be interconnected with a battery 11 to operate as a motor to crank the engine when certain current-consuming devices 27 are to be disconnected from a source of alternating current designated by the mains 1 and 4 and are to be connected to the dynamo-electric machine 43 which is to be operated as a generator by the internal combustion engine. The starting system for the internal combustion engine is provided with a thermostatic cranking cut-out 13, a starting contactor 38 and a reverse current relay 36 for effecting the connection of the current-consuming devices 27 to the generator 43 when the voltage of this generator has attained a desired value after the starting of the internal combustion engine. The transfer of the current-consuming devices 27 from the mains 1 and 4 to the generator 43 is effected by an appropriate operation of the voltage-responsive device 9.

A better and more complete understanding of this invention can probably be had from a study of a typical transfer sequence when it is assumed that the voltage on the mains 1 and 4 fails. Assume first that the mains 1 and 4 are energized at the desired voltage, whereupon an energized circuit is established from main 1 through primary winding 2 of the transformer 3 to the main 4. The secondary winding 5 of the transformer 3 is thus energized and a circuit is established from the upper or positive terminal of the double wave rectifier 6 through the stop switch 7, actuating coil 8 of the voltage-responsive transfer contactor 9, conductor 10, the battery 11, series heater 12 of the thermostatic cranking cut-out relay 13, and conductor 14 to the negative terminal of the double-wave rectifier 6. This circuit just traced not only causes the operation of the transfer contactor 9 but also provides for a continuous trickle charge for the battery 11 from the source of alternating current through the rectifier 6.

Operation of the transfer contactor 9 closes the contact members 15, 21 and 20 and opens the contact members 32. This operation thus establishes a circuit from the main 1 through contact members 15, conductor 16, current-consuming devices 17, conductors 18 and 19, and contact members 20 to the main 4. The current-consuming devices 17 are of the non-emergency type that need not be energized in the event of a voltage failure of the main source of supply, namely, a failure of the voltage across the mains 1 and 4.

A further circuit is established from the positive terminal of the rectifier 6 through the stop switch 7, contact members 21, actuating coil 22 of the line contactor 23 and conductor 24 to the negative terminal of the rectifier 6. Actuating coil 22 is designed to have sufficient ampere turns to overcome the effect of the high reactance holding coil 70 of the line contactor 23, which holding coil 70 is suitably energized from the direct current dynamo-electric machine 43 to hold contact members 25 and 28 open during the operation of the dynamo-electric machine 43. The details of this operation will become clearer in the discussion given hereinafter.

The operation of the line contactor 23 by reason of the energization of the actuating coil 22 establishes a circuit from the main 1 through contact members 15 and 25, conductor 26, current-consuming devices 27, and conductor 18 to the energized conductor 19. The current-consuming devices 27 are devices such as flood lights on landing fields or exit lights and aisle lights in theaters, which must remain energized regardless of the failure of the voltage across the mains 1 and 2.

Assume that the voltage across mains 1 and 4 fails, which, of course, means that the voltage across the positive and negative terminals of the rectifier 6 will also become zero, thereby deenergizing the coils 8 and 22 of the transfer contactor 9 and line contactor 23, respectively. Current-consuming devices 17 will, of course, be deenergized by reason of the voltage failure across the mains 1 and 4, whereas the current-consuming devices 27 will be temporarily deenergized by the opening of the circuit for the devices at the contact members 25 by reason of the deenergization of the actuating coil 22.

The deenergization of the transfer contactor 9 causes the opening of contact members 15, 20 and 21, thereby disconnecting the load lines and also the actuating coil 22 from the mains 1 and 4. The closing of contact members 32, however, establishes a circuit from the positive terminal of the battery through conductor 10, contact members 32 of the transfer contactor 11, contact members 33 of the thermostatic cranking cut-out relay 13, conductor 34, contact members 35 of the reverse current relay 36, actuating coil 37 of the starting contactor 38, and series heater 12 of the relay 13 to the negative terminal of the battery.

The operation of the starting contactor 38 establishes a circuit for the shunt heater 39 of the relay 13 through the contact members 40, and the starting circuit is also established from the energized conductor 10 through conductor 41, armature 42 of the dynamo-electric machine 43, series field winding 44, series coil 45 of the reverse current relay 36, contact members 46 and heater 12 to the negative terminal of the battery 11. A further circuit is also established for the shunt coil 52 of the reverse current relay 36, this circuit being established through the resistor 50 and the contact members 51 connected in parallel.

Under normal operation, the engine will start to operate, but if for any reason the engine should fail to operate, the heaters 12 and 39 would continue to be energized and after a predetermined cranking interval the thermostatic element 66 would move in such a position that the end thereof would pass into the aperture 68 and the spring 67 would open the contact members 33, thereby disconnecting the dynamo-electric machine from the battery to discontinue any further cranking without some attention on the part of the attendant to investigate the source of the trouble.

Assuming that the engine 30 starts, the dynamo-electric machine 43 will thus be caused to operate as a generator and the motoring current in the coil 45 will decrease to zero and, in consequence, the reverse current relay 36 will be caused to operate. Prior to the generator operation of the dynamo-electric machine 43, coils 45 and 52 were energized in such a manner as to oppose each other and this reverse current relay 36 is thereby prevented from operating prior to the starting of the engine and to a predetermined rise in the generator voltage of the dynamo-electric machine 43. It will be noted that the coil 52 is connected across the terminals of the dynamo-electric machine 43 and is energized in the same direction as it was energized previously from the battery 11. However, the current through coil 45 is reversed.

Before there is any appreciable rise in the current in coil 45, the reverse current relay 36 will be caused to operate to open its contact members 35 and 51 and to close its contact members 63. Opening of the contact members 51 merely inserts the resistor 59 directly in circuit with the coil 52 to decrease the continuous current that this coil thereafter consumes, whereas the opening of contact members 35 opens the circuit for the actuating coil 37 of the starting contactor 38, which contactor thereupon opens the contact members 46 to disconnect the battery 11 from the generator 43 and also open the circuit for the shunt heater 39 of the cranking cut-out relay 13.

During the starting operation, it is, of course, desirable to properly vaporize the gasoline passing to the internal combustion engine 30 and also to increase the relative amount of fuel supplied to the internal combustion engine. This is accomplished by the circuit established from the energized conductor 10 through contact members 32, contact members 33 of the relay 13, conductor 34, contact members 35, conductor 53, fuel heater 54 and actuating coil 55 of the choke 56, connected in parallel, and conductor 57 to the negative terminal of the battery. The opening of the contact members 35 also interrupts the circuits for the elements 54 and 55 just mentioned, thereby no longer heating the fuel passing through the internal combustion engine and decreasing the fuel supply to the normal quantity needed.

As the voltage of the generator 43 rises, an energized circuit is established from the conductor 10 through actuating coil 58 of the contactor 59 and conductors 60 and 61 and series field 49 to the negative terminal of the generator 43. It will be noted that the rheostat 47 and shunt field 48 are also connected across the terminals of the generator 43.

Operation of the contactor 59 establishes a circuit from the positive terminal of the generator 43 through conductors 41 and 10, contact members 64, conductor 18, current-consuming devices 27, conductors 26 and 62, contact members 63, conductor 61 and series field 49 to the negative terminal of the generator 43. Since conductors 18 and 26 are energized from the generator 43, the holding coil 70 of the line contactor 23 is thus energized from the generator and thus maintains contact members 25 and 28 open so as not to remove the effective ignition circuit for the internal combustion engine 30.

When the power or the voltage returns on the mains 1 and 4, the transformer 3 is, of course, again energized, and the normal voltage again appears at the positive and negative terminals of the rectifier 6. The circuit heretofore traced for the actuating coil 8 of the transfer contactor 9 is again established and in consequence, conductors 16 and 18 are connected directly to mains 1 and 4 and the actuating coil 22 of the line contactor 23 is energized to oppose the effect of the holding coil 70. As heretofore explained, the effect of coil 22 is of sufficient strength to overcome the action of coil 70, thereby closing the contact members 25 to connect the current-consuming devices 27 to the mains 1 and 4 and also causing the "shorting out" of the ignition system 29 for the internal combustion engine 30 by the closing of the contact members 28. Since the voltage of the generator 43 decreases, the contactor 59 is deenergized and contact members 64 are opened. Further the energization of coil 52 ceases and, in consequence, contact members 63 are opened, thereby completely disconnecting the generator 43 from the conductors 18 and 26. However, by the closure of contact members 35, the emergency power plant is again put into such position that a second failure of voltage on the mains 1 and 4 will again start the transfer cycle by again starting the emergency power plant and also by disconnecting the current-consuming devices 27 from the mains 1 and 4 and connecting these current-consuming devices to the generator 43 operated by the internal combustion engine 30.

Applicants are aware of the fact that others skilled in the art, particularly after having had the benefit of the teachings of this invention, can devise other circuit diagrams and automatic transfer means for accomplishing the novel results hereinbefore set out and claimed in the appended claims. Applicants do not wish to be limited to the specific circuit arrangement shown, but wish to be limited only by the scope of the claims.

We claim as our invention:

1. In an electric system, a consuming circuit, a source of alternating current, a line contactor, a relay responsive to the voltage of said source adapted to energize said contactor to connect and disconnect said consuming circuit with the source of alternating current, a direct current dynamo-electric machine, a battery, an internal combustion engine, a starting contactor, means operable by said relay to cause the operation of said starting contactor to connect said machine to drive said engine, means responsive to the generator action of said machine to deenergize said starting contactor to disconnect the battery from the machine, and means responsive to the generator action of said machine to connect said consuming circuit to said machine.

2. In an electric system, a consuming circuit, a source of alternating current, a rectifier connected to said source, a line contactor, a relay connected to the rectifier and thus responsive to the voltage of said source adapted to energize said contactor from said rectifier to connect and disconnect said consuming circuit with the source of alternating current, a direct current dynamo-electric machine, a battery, an internal combustion engine, a starting contactor, means operable by said relay to cause the operation of said starting contactor to connect said machine and the battery to drive said engine, means responsive to the generator action of said machine to deenergize said starting contactor to disconnect the battery from the machine, and means responsive to the generator action of said machine to connect said consuming circuit to said machine.

3. In an electric system, a consuming circuit, a source of alternating current, a rectifier connected to said source, a line contactor, a relay, connected to the rectifier to be responsive to the voltage of said source, adapted to energize said contactor from said rectifier to connect and disconnect said consuming circuit with the source of alternating current, a direct-current dynamo-electric machine, a battery, means for connecting said battery to said rectifier to charge the battery from said source, an internal combustion engine, a starting contactor, means operable by said relay to cause the operation of said starting contactor to connect said machine to the battery to drive said engine, means responsive to the generator action of said machine to deenergize said starting contactor to disconnect the battery from the machine, and means responsive to the generator action of said machine to connect said consuming circuit to said machine.

4. In an electric system, a consuming device, a source of alternating current, a source of direct current, said sources being adapted to be connected respectively to supply energy to said device, a rectifier, means, connected to the rectifier to be responsive to the voltage of said source of alternating current, adapted to disconnect said device from said source of alternating current, and means, responsive to the voltage of said direct-current source of power, adapted to connect said devices to said source of direct-current power.

5. In an electric system, in combination, a load circuit, a source of power connected normally to supply energy to said load circuit, a stand-by power plant comprising an internal combustion engine, a generator, a battery, means adapted to cause said battery to be charged from said source of power, means responsive to a failure of voltage of said source of power to cause the starting of said engine to drive the generator and to disconnect said load circuit from said source of power, and means responsive to a certain voltage of said generator to connect said load circuit to said generator.

LEO C. FRANK.
STANLEY A. BOBE.